(12) United States Patent
Bergeron

(10) Patent No.: US 6,364,011 B1
(45) Date of Patent: Apr. 2, 2002

(54) SYSTEM AND METHOD FOR HANDLING TUBULAR MEMBERS

(76) Inventor: Billy James Bergeron, 223 Bergeron Rd., Arnaudville, LA (US) 70512

( * ) Notice: Subject to any disclaimer, the term of this patent is extended or adjusted under 35 U.S.C. 154(b) by 0 days.

(21) Appl. No.: 09/680,060

(22) Filed: Oct. 4, 2000

(51) Int. Cl.[7] .......................... B23P 19/12; E21B 19/18
(52) U.S. Cl. ....................... 166/77.51; 29/237; 29/240; 29/407.02; 166/378; 166/379; 166/380; 166/85.1; 166/85.5; 414/22.51; 414/22.62
(58) Field of Search .............................. 29/407.02, 237, 29/240; 166/378, 379, 380, 77.51, 85.1, 85.5; 414/22.51, 22.62

(56) References Cited

U.S. PATENT DOCUMENTS

| | | | | |
|---|---|---|---|---|
| 1,765,825 A | * | 6/1930 | Cork | |
| 2,941,284 A | * | 6/1960 | McConnell | |
| 3,241,224 A | * | 3/1966 | Banister et al. | |
| 3,710,475 A | * | 1/1973 | Bronstein | |
| 4,092,881 A | * | 6/1978 | Jurgens et al. | |
| 4,437,218 A | * | 3/1984 | Pridy | 29/240 |
| 4,547,109 A | * | 10/1985 | Young et al. | 414/22 |
| 4,632,618 A | * | 12/1986 | Issakainen | 414/22 |
| 4,791,997 A | * | 12/1988 | Krasnov | 414/22.51 |
| 4,834,195 A | * | 5/1989 | Robinson | 414/22.62 |
| 5,505,565 A | * | 4/1996 | Canales | 166/77.51 |
| 5,520,072 A | * | 5/1996 | Perry | |

FOREIGN PATENT DOCUMENTS

| | | | | |
|---|---|---|---|---|
| EP | 389288 | * | 9/1990 | 414/22.51 |
| GB | 1592457 | * | 7/1981 | 414/22.51 |

* cited by examiner

Primary Examiner—S. Thomas Hughes
Assistant Examiner—Eric Compton
(74) Attorney, Agent, or Firm—Domingue & Waddell, PLC (57) ABSTRACT

An apparatus for handling a plurality of tubular members. The apparatus comprises A tong member for coupling a first tubular with a second tubular. A first axial roller is positioned on the first side of the tong member and a second axial roller is positioned on the second side of the tong member. A hydraulic power pack is used to provide power to the first roller, the second roller, and the tong member. A first Y-frame roller is positioned on the first side of the tong means, and a second Y-frame roller positioned on the second side of the tong member. In the preferred embodiment, the axial and Y-frame rollers are connected to a support member, with the first axial roller being configured for movement of the plurality of tubular members in a longitudinal direction and the second Y-frame rollers being configured for movement of the plurality of tubular member in a radial direction. A first hydraulic cylinder may be attached at one end to the support member and attached at the other end to the first axial roller. The hydraulic power pack provides power to the first hydraulic cylinder so as to lower the first axial roller. The axial rollers may also include a motor having a shaft, and wherein the shaft is attached to the axial rollers, with the motor being operatively connected to the power pack for imparting a rotating movement to the shaft. The apparatus may further include a master bushing with a rat hole that is adapted to receive the tubular members. A method for coupling and de-coupling a plurality of tubular members is also disclosed.

11 Claims, 12 Drawing Sheets

SYSTEM AND METHOD FOR HANDLING TUBULAR MEMBERS

BACKGROUND OF THE INVENTION

This invention relates to a system for handling tubular members. More particularly, but not by way of limitation, the invention relates to a system and method for handling tubular members in a horizontal or vertical mode away from the drill floor of an oil and gas drilling rig.

When drilling for oil and gas, a drilling rig is utilized. Generally, a tubular string having a drill bit at one end is utilized to bore a well bore as is well understood by those of ordinary skill in the art. Typical well bores reach several thousand feet in length. Some well bores are vertical, some are highly deviated, while others are horizontal. Additionally, some wells are being drilled today that contain multi-lateral wells that extend from a singular well bore.

Generally, the tubular members are approximately thirty feet in length. Two to three joints of pipe are usually joined at the rotary to form what is called a stand of pipe. These stands of pipe are stored upright in the derrick for use. As those of ordinary skill in the art will appreciate, the tubulars are then joined at the rotary bushing a stand at a time for running into the hole. The process for pulling out of the hole is essentially the same, except in reverse. The drilling rig will contain all of the necessary components for the handling of the tubular members in stands, and in particular, the drill floor contains the major components. In prior art designs, the making up and breaking down of the tubular member joints takes place on the drill floor.

The making up and breaking down of the tubular string is a lengthy and time consuming process. While the pipe is being either broken down or made up, no other activity can take place on the drill floor over the rotary. Therefore, there is a need for a system and method that will make up or break down tubular members. There is also a need for a system and method that will threadedly engage or disengage tubular members away from the drill floor. There is also a need for a system and method for properly torquing together tubular members. These and many other needs will be met by the invention herein described.

SUMMARY OF THE INVENTION

An apparatus for handling a plurality of tubular members is disclosed. The apparatus comprises a tong member for coupling a first tubular member with a second tubular member in a horizontal orientation. A first axial roller is positioned on the first side of the tong member and a second axial roller is positioned on the second side of the tong member. Power means are included for providing power to the first roller, the second roller, and the tong member.

The apparatus may further contain a first Y-cradle roller positioned on the first side of the tong means, and a second Y-cradle roller positioned on the second side of the tong member. In the preferred embodiment, the tong member comprises a first gripper member for gripping a pin end of the first tubular member and a second gripper member for gripping a box end of the second tubular member; and, a power drive section turning the gripper members so that the pin end is threadedly engaged with the box end.

In the preferred embodiment, the axial rollers and Y-cradle rollers are connected to a support member, with the first axial roller being configured for movement of the plurality of tubular members in a longitudinal direction and the second Y-cradle rollers being configured for movement of the plurality of tubular member in a radial direction. A first cylinder may be attached at one end to the support member and attached at the other end to the first axial roller. The first cylinder may be connected to the power means for powering the first cylinder so as to lower the first axial roller. The axial rollers may also include a motor having a shaft, and wherein the shaft is attached to the axial rollers, with the motor being operatively connected to the power means for imparting a rotating movement to the shaft.

In the preferred embodiment, the power means for providing power to the axial rollers, the tong member and first cylinder comprises a hydraulic motor for generating a hydraulic pressure. Additionally, a hydraulic control-circuit panel that is operatively connected to the hydraulic motor is included, with the hydraulic control panel selectively providing a hydraulic operating fluid to the axial rollers, the tong member, and the cylinder.

The apparatus may further include a master bushing with a rat hole that is adapted to receive the tubular members. This may allow for vertical make-up of tubulars including drill pipe, drill collars, stabilizers, down hole tools including the drill bit. This may also allow make up of casing joints during casing running operations.

A method for coupling and de-coupling a plurality of tubular members is also disclosed. The method includes placing a first tubular in a horizontal orientation onto a first axial roller and placing a second tubular in a horizontal orientation onto a second axial roller. Next, the first tubular is advanced with the first axial roller into a tong member in a horizontal orientation. The second tubular is advanced with the second axial roller into the tong means in the horizontal orientation. The pin end of the first tubular is placed into the box end of the second tubular and the second tubular is rotated with the tong member which threadedly engages the first and second tubulars.

The method further comprises opening the tong member and lowering a first end of the first and second axial rollers which in turn ejects the joined first tubular and second tubular. The method further comprises placing a third tubular in a horizontal orientation onto the first axial roller and placing a fourth tubular in a horizontal orientation onto the second axial roller. The third and fourth tubulars are advanced with the first and second axial rollers into the tong member and the tong member is closed. The tong member are adapted to receive the first tubular in the horizontal orientation.

Next, the fourth tubular is advanced with the second axial roller into the tong member, and wherein said tong member is adapted to receive the fourth tubular in the horizontal orientation. The pin end of the third tubular is placed into the box end of the fourth tubular. The fourth tubular is rotated with the tong member which in turn threadedly engages the third tubular with the fourth tubular so that the third tubular and the fourth tubular are joined.

The method further comprises opening the tong member and lowering a first end of the first axial roller and lowering a first end of the second axial roller. The joined third and fourth tubulars can then be ejected.

In one of the preferred embodiments, the step of threadedly engaging the third tubular with the fourth tubular includes measuring the amount of torque applied to the pin end of the third tubular into the box end of the fourth tubular. The amount of torque can be computer verified and the applied torque is recorded for documentation purposes. The amount of torque can also be applied manually.

The method may further include placing the joined third tubular and fourth tubular onto the first and second axial roller. The tong means are closed and the pin end of the third tubular is engaged with the tong member and the box end of the fourth tubular is engaged with the tong means. The tong member rotates the fourth tubular which in turn threadedly disengaging the third tubular with the fourth tubular so that the third tubular and the fourth tubular are separated. The tong member is opened. The first end of the first and second axial roller is tilted which in turn ejects the third and fourth tubular.

An advantage of the present invention includes the ability to join two lengths or more of drill pipe (or other tubulars such as casing) away from the drill floor. This allows a time savings since operations on the drill floor since drilling can proceed while the pipe is being coupled together. The joined pipe will be ready for the driller without having the driller waiting on the makeup procedure. Another advantage is the ability to make-up drill pipe, casing, drill collars, etc, with the system.

Another advantage is having a combined horizontal and vertical pipe handling system. Additionally, the system can be used with casing joints and drilling tools of various diameters, sizes and configurations. Another advantage is the horizontal cradle for the tubulars.

A feature of the present invention includes use of hourglass shaped acceptance rollers. The hourglass rollers may be constructed of a polymer material. Another feature is that the hourglass rollers have motors to propel individual tubulars toward each other until the threaded ends are introduced to each other. The system will have a means for spinning the tubular in order to rotate one tubular while the other is locked by a backup jaw system.

Another feature is that the system will contain the makeup/breakout torquing apparatus for joint makeup or breakout (during joint disassembly). Another feature is that the system propels the sections of tubular either towards or away from each other by the axial (hourglass) rollers. Yet another feature is the cylinders used to lift and lower the axial (hourglass) rollers to elevate and/or lower the tubulars held in the rollers. Still yet another feature is that tubulars of varying diameters can be effectively joined. Yet another feature is the altering adjustable height of first axial or second axial rollers allows for varying diameters of tubulars.

Another feature is that the rollers, including the axial and Y-cradle, allow the tubulars to be rotated during operations. Another feature is that the axial and Y-cradle rollers allow the individual or joined tubulars to be quickly released and allowed to roll safely down onto prescribed racks for storing the pipe. Yet another feature is that the entire system may be powered by a hydraulic power pack.

Yet another feature is the master bushing that is mounted below the tong member. This allows for vertical making up or breaking down of down hole tools (such as bits, bottom hole assemblies, etc). The master bushing may contain well known industry means such as the bowls, split bushings and retainer slips. Still yet another feature is the use of a "mouse hole" which is a vertically standing cylinder or tube capable of receiving the vertically suspended components of a bottom hole assembly. Another feature is the ability of the tongs to pivot from a horizontal inclination to a vertical inclination. These features, and many others, will be apparent from a reading of the detailed description of the preferred embodiments.

DETAILED DESCRIPTION OF THE PREFERRED EMBODIMENTS

Figure 1:
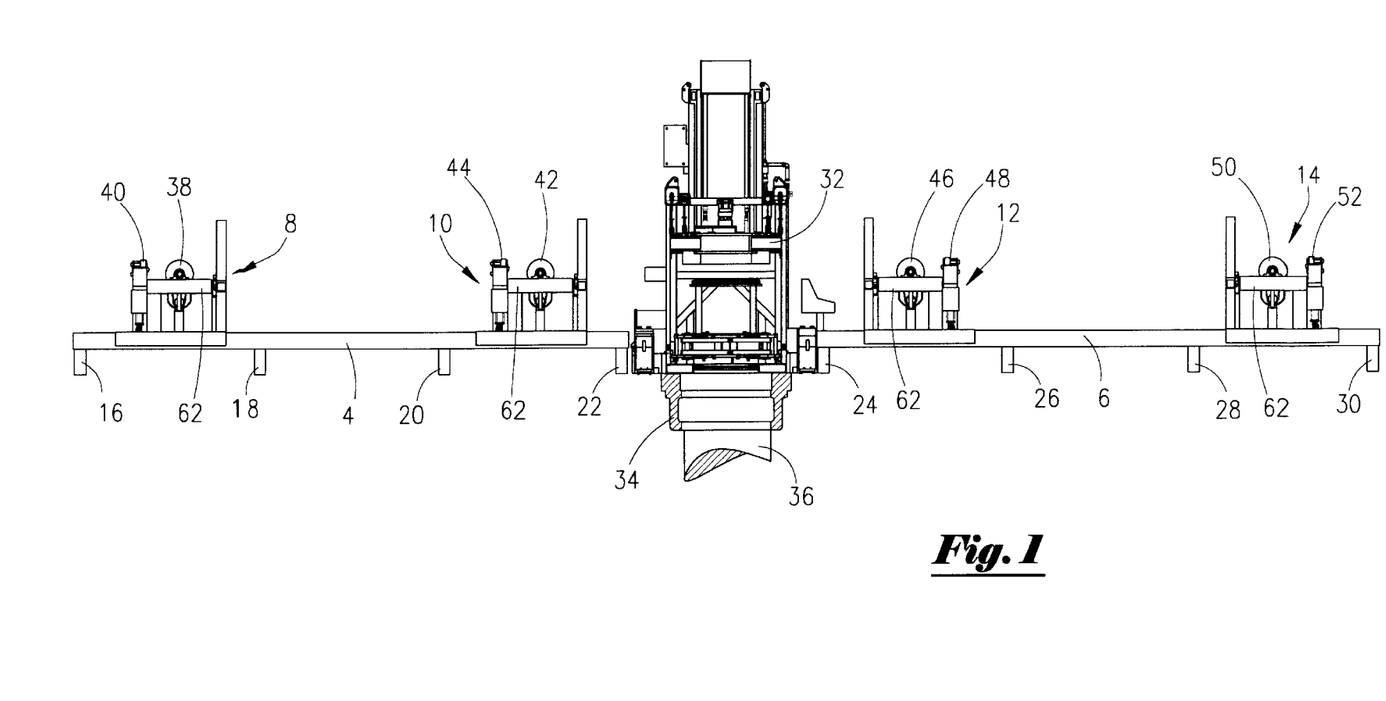
FIG. 1 is a schematic illustration of the tubular handling system of the present invention.

Referring now to FIG. 1, an illustration of the tubular handling system of the present invention will now be described. The system 2 includes a first stand 4 and a second stand 6. The stand 4 has operatively attached the first roller unit 8 and second roller unit 10 while the stand 6 has operatively attached the third roller unit 12 and the fourth roller unit 14. The stand 4 has supporting legs 16, 18, 20, 22 and the stand 6 has supporting legs 24, 26, 28, 30.

FIG. 1 depicts the tong member 32 in its vertical inclination. The master bushing 34 is situated vertically below the tong member 32 in FIG. 1. The tong member 32 is commercially available from Superior Manufacturing & Hydraulics, Inc. under the trade name Kwick Konnect T.H.S. The mouse hole 36 is shown below the master bushing 34, with the mouse hole capable of receiving any of the vertically combined bottom hole assemblies and/or tubulars which can be made up or broken down in accordance with the teachings of this invention.

Each of the roller units will contain the axial roller, Y-cradle, means for rotating the axial roller, and means for lowering the axial roller and Y-cradle. As seen in FIG. 1, the roller units contain the axial roller 38 and the Y-cradle 40, the axial roller 42 and the Y-cradle 44, the axial roller 46 and the Y-cradle 48, and the axial roller 50 and the Y-cradle 52. In this application, each roller unit that contains an axial roller and Y-cradle will be referred to as a roller unit.

The system may also include a vertical track for use when the tongs accept vertically inclined tubulars. The track allows elevating or lowering of the tongs when dealing with the vertically inclined tubulars.

Figure 2:
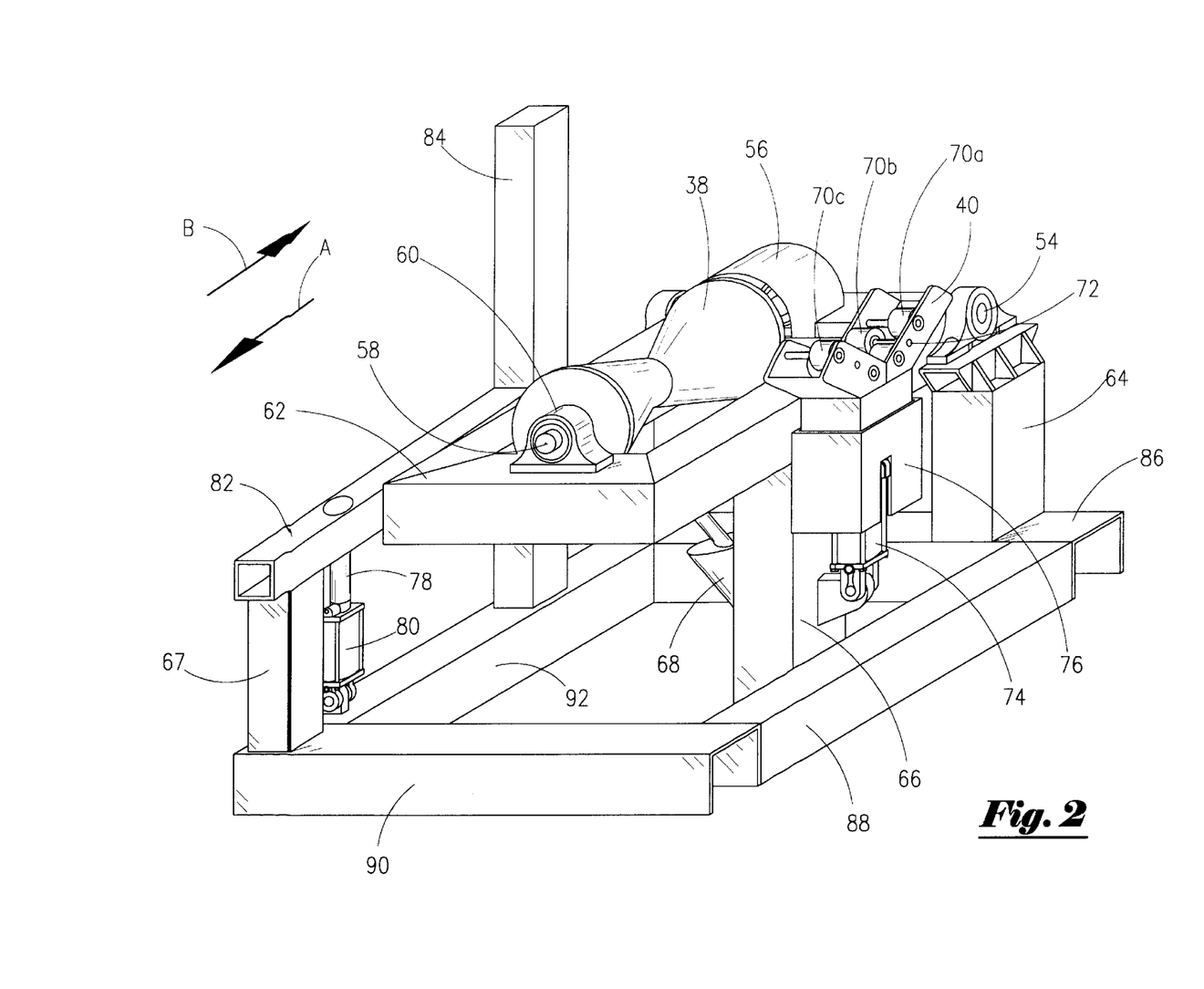
FIG. 2 is a perspective view of the axial roller and Y-cradle mounted on a frame.

Referring now to FIG. 2, a schematic illustration of the axial roller 38 and Y-cradle 40 mounted on a unit roller will now be described. It should be noted that like numbers refer to like components in the various figures. The axial roller 38 is also referred to as the hour glass roller (which can be constructed of a polymer material) and is used for axial movement of the tubular member. A motor and chain member is operatively associated with the axial roller for imparting a rotational movement of the axial roller 38 in order to advance (or retreat) the tubular member as will be more fully explained later in the application.

The pillow block bearing, for pivoting the frame that has the axial roller 38 and Y-cradle attached thereto, is shown as numeral 54. The motor means and chain guard is denoted as 56. The shaft 58 is shown with the pillow block bearing and housing 60. Thus, the motor causes the shaft 58 to rotate in either axial direction so that the shaft 58 is turned thereby moving the pipe that resting within the axial roller 38. The axial roller 38 is mounted on the axial roller elevation frame 62 which is generally a rectangular frame mounted to vertical supports (supports 64, 66, 67 shown). Additionally, the frame 62 will have the hydraulic cylinder means 68 for lifting/lowering one side of the frame 62 so that the pipe may be removed. When the cylinder means 68 is contracted, the pipe will roll off the roller 38 in the direction noted by the arrow A.

The Y-cradle 40 includes a plurality of yolk rollers (rollers shown in this figure are 70a, 70b, 70c) that are pivotly attached to the y-frame member 72. The Y-cradle 40 allows the pipe to be rotated when the horizontal tubular connections are either being threadedly screwed together or unscrewed. The Y-cradle 40 is operatively connected to a hydraulic lift cylinder 74. The lift cylinder 74 is connected to the Y-cradle 40 through the sleeve 76, with the sleeve 76 being attached to support 66 which in turn is connected to frame 62. Thus, the hydraulic lift cylinder 74 is capable of lifting the Y-cradle 72 which in turn will lift the tubular member resting therein. The raising of the tubular member is accomplished when the operator wishes to make up or break out the tubular connections. The tubular is lifted so that the tubular no longer rests on the axial roller 38.

A safety stop pin 78 is also included. The safety pin 78 is also hydraulically controlled in the preferred embodiment as shown with the hydraulic cylinder 80. The safety pin 78 is shown in the retracted position and is selectively activated by the operator. The safety pin 78 is activated to prevent the tubular from rolling off the roller unit. The pin 78 is disposed through the pipe railing 82. The pipe railing is the railing that rolls the pipe off the roller 38/Y-cradle 40. The pipe railing is disposed at an angle. A back stop member 84 is also included which acts as a stop for any inadvertent rolling of the pipe in the direction denoted as B in FIG. 2. It should also be noted that the base structure (including members 86, 88, 90, 92) is shown.

Figure 3:
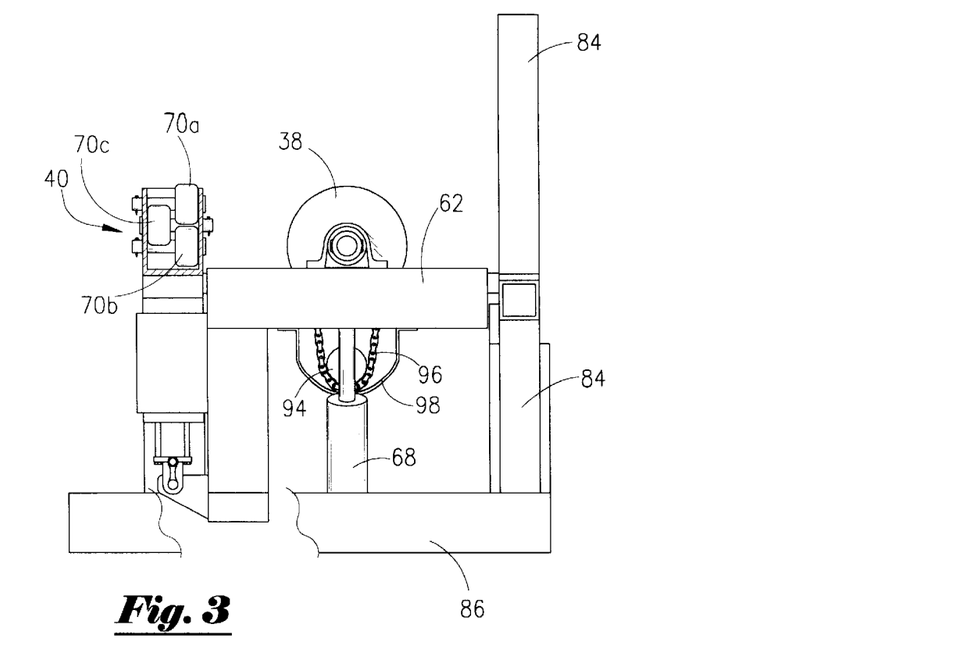
FIG. 3 is a front view in partial cutaway of the frame of FIG. 2.

FIG. 3 a front view of the roller unit of FIG. 2 that depicts the hydraulic motor 94 along with the chain and sprocket 96. The chain will be operatively associated with a sprocket located on the axial roller 38 so that when the motor turns, the chain will in turn impart the rotation force to the axial roller 38. A guard 98 protecting the operator from the chain and motor is also shown along with the Y-cradle 40.

Figure 4:
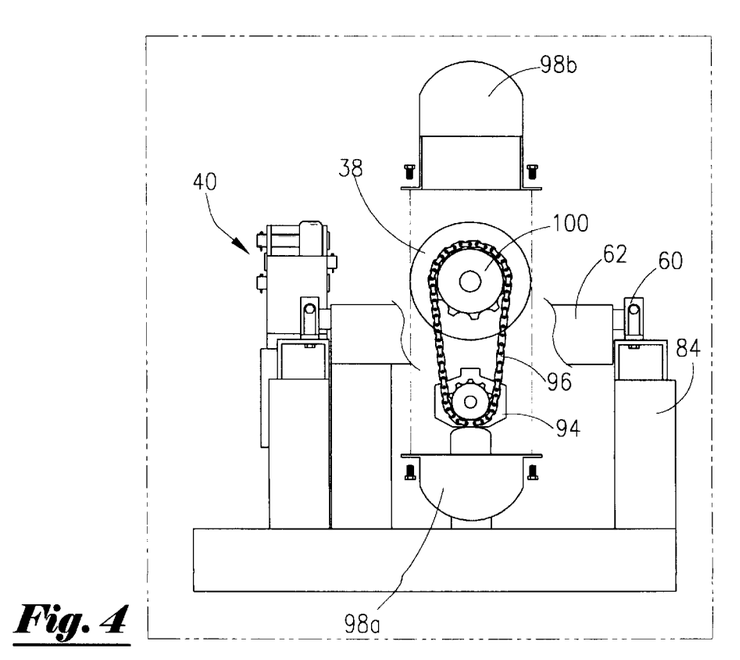
FIG. 4 is a partial cut away view taken from FIG. 2 of the hydraulic motor means for imparting rotation to the axial roller.

FIG. 4 depicts a partial cut away view of the hydraulic motor means for imparting rotation to the axial roller. FIG. 4 depicts the covers 98A and 98B being detached so that the chain 96 is seen engaging the sprocket 100 of the axial roller 38, with the motor 94 having its own sprocket 102.

Figure 5A:
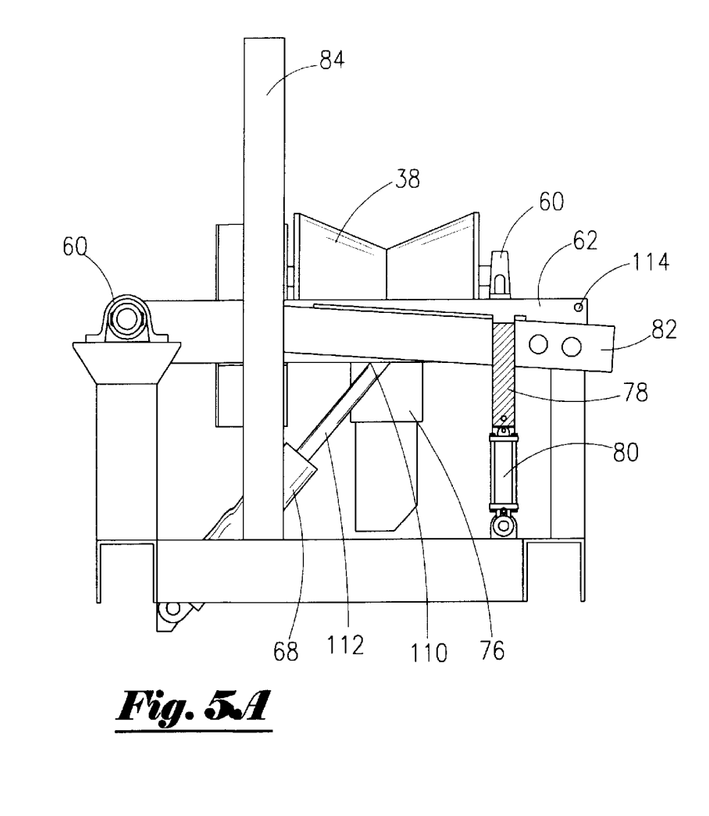
FIG. 5A is a front view of the frame of FIG. 2.
Figure 5B:
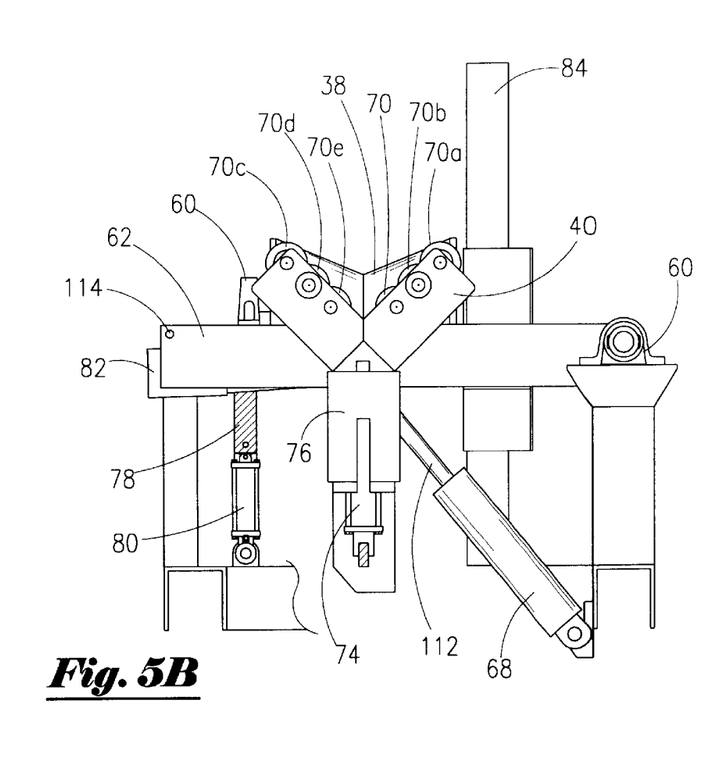
FIG. 5B is a rear view of the frame of FIG. 2.

Referring now to FIG. 5A, a front view of the frame illustrated in FIG. 2 will now be described. The axial roller 38 along with the hydraulic cylinder means 68 is depicted. The hydraulic lift cylinder 80 that is attached to the safety pin 78 is shown, with the pin 78 disposed through the rail 82. In FIG. 5B, a partial cut-away rear view of the frame of FIG. 2 is depicted. The Y-cradle 40 is shown along with the associated yolk rollers 70a, 70b, 70c, 70d, and 70e. The axial roller 38 is depicted in the background. FIGS. 5A and 5B also depicts the hydraulic cylinder 68 and its connection to the axial roller elevation frame 62. The hydraulic cylinder is connected at 110 to the frame 62 via the extending arm 112 from the hydraulic cylinder 68 as illustrated in FIG. 5A. In operation, as the extending arm 112 is contracted, the end 114 of the axial roller frame 62 is lowered downward so that frame 62 is approximately parallel with rail 82 so that the tubular can roll off.

Figure 6:
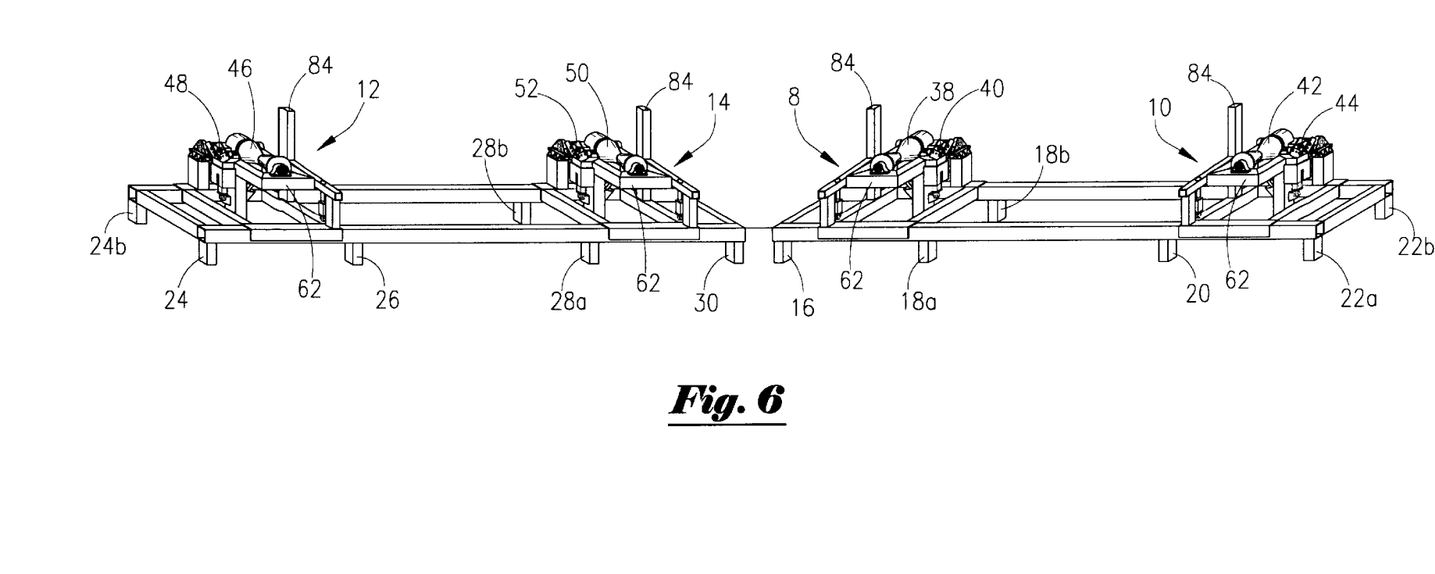
FIG. 6 is a partial view of the main frame system used with the present invention.

A partial view of the main frame system used with the present invention will now be described with reference to FIG. 6. The roller unit 8 (which contains the axial roller 38 and the Y-cradle 40) is mounted on the main frame structure; the roller unit 10 (which contains the axial roller 42 and the Y-cradle 44) is mounted on the main frame structure; the roller unit 12 (which contains the axial roller 46 and the Y-cradle 48) is mounted on the main frame structure; and, the roller unit 14 (which contains the axial roller 50 and the Y-cradle 52) is mounted on the main frame structure.

The main frame structure includes first segment with the units 8 and 10 connected via conventional means such as nut and bolt mounting or welding and the second segment with the units 12 and 14 connected via conventional means such as nut and bolt mounting or welding. The main frame structure is generally a rectangular configured support structure. As noted earlier, the legs 16, 18a, 18b, 20, 22a, 22b, 24a, 24b, 26, 28a, 28b, 30 extend from the horizontal support members. In the preferred embodiment, each side of the tong unit will have two roller units (for instance units 8 and 10); however, the system is applicable to having only one roller unit or greater than two roller units. The number and spacing of the roller units depends on design considerations, however, two roller units per side represents the preferred embodiment.

Figure 7:
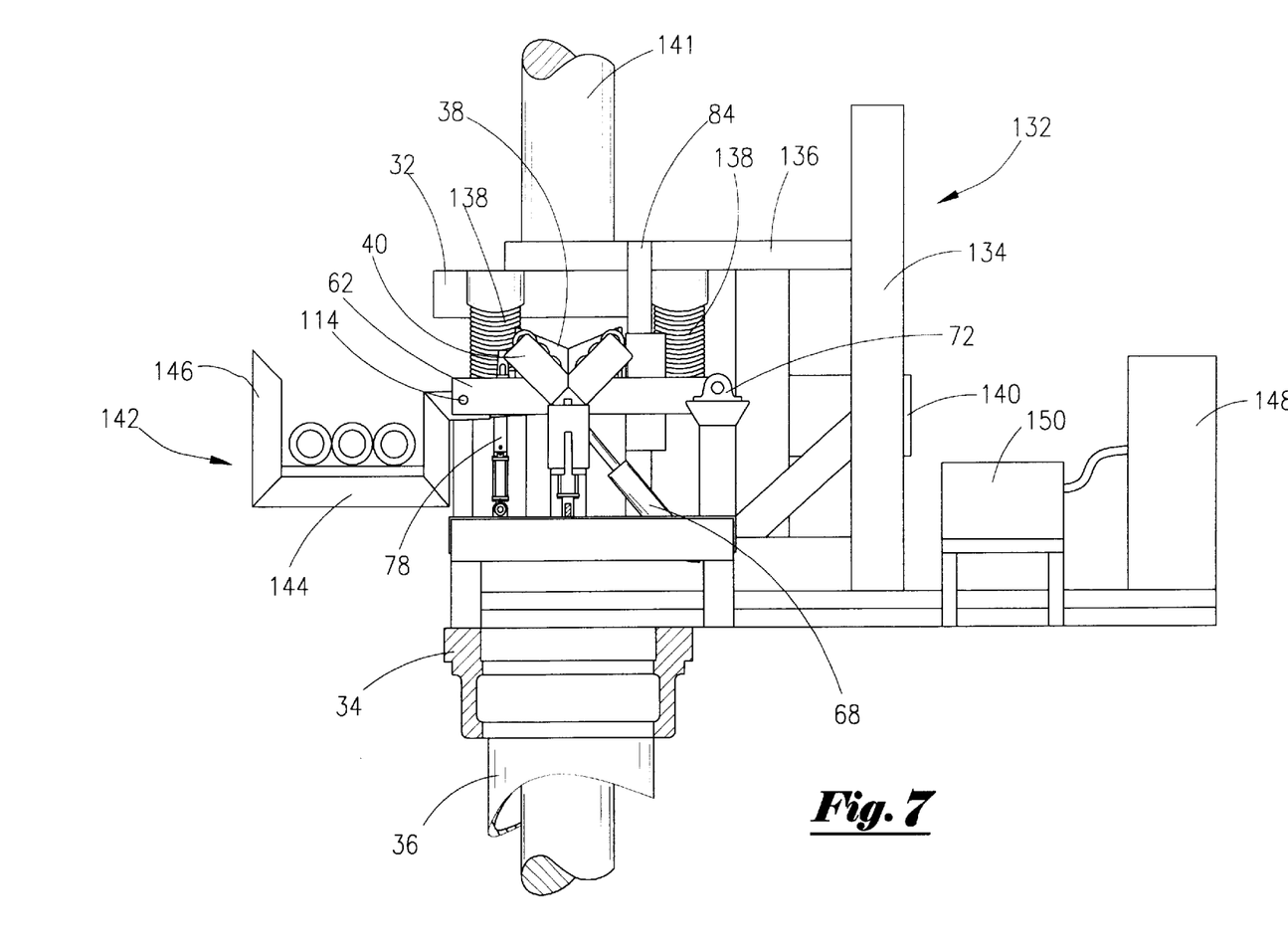
FIG. 7 is a front perspective view of the tubular handling system of the present invention.

In FIG. 7, a front perspective view of the tubular handling system of the present invention is illustrated. The system is oriented for vertical manipulation of tubulars. The axial roller 38 and Y-cradle is mounted on the roller unit as previously described. The hydraulic cylinder means 68 is shown along with the safety pin 78 and associated hydraulic cylinder 80. FIG. 7 also depicts the tong member 32 for threadedly making up the tubular connections or breaking down the tubular connections.

The tong member 32 includes the tong handling unit 132 that suspends the tong means 32. The tong handling unit 132 includes the vertical support member 134 and the horizontal support member 136 that has a spring support 138 suspending the tong member 32 as seen in FIG. 7. The tong member 32 is pivotly attached via pivot point 140. Thus, by using the pivoting means, the operator can position the tong member 32, and in particular the jaws of the tong member 32, to accept a pair of tubulars placed in either the vertical or horizontal inclination. FIG. 7 depicts the tubular member 141 being positioned within the tong member 32 for make-up or break down.

FIG. 7 also depicts the pipe catcher 142. The pipe catcher 142 includes a railing 144 that leads to the vertical stop plate 146. In operation, the tubulars will be ejected from the axial roller 38 and Y-cradle 40 by lifting (via the hydraulic lift cylinder 68) the axial roller/Y-cradle on one end which in turn will cause the tubular to roll to the pipe catcher 142.

The hydraulic power pack 148 is also depicted that controls and delivers the necessary hydraulic power to the hydraulic components. The hydraulic power pack 148 is fluidly connected to the various hydraulic components utilizing well known means such as pressure rated hoses. Also depicted in FIG. 7 is the control panel 150 that controls the delivery of the hydraulic fluid to the various components as is well understood in the art.

Figure 8:
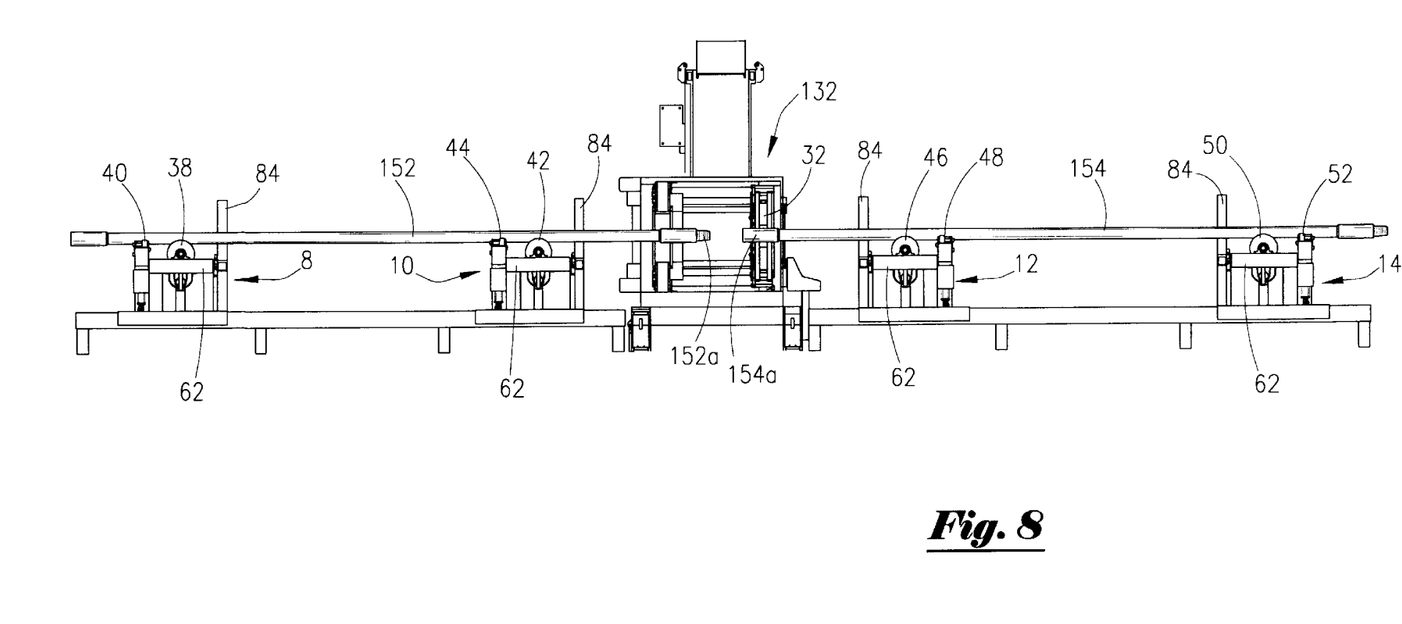
FIG. 8 is a side perspective view of the tubular handling system seen in FIG. 7.

Referring now to FIG. 8, which is a side perspective view of the tubular handling system seen in FIG. 7, the operation of the system will now be described. The tong member 32 has been pivoted in order to receive horizontally oriented pin and box connections. In FIG. 8, the system is shown in the pipe joining position with the tong means 32 retracted (two to four feet in the preferred embodiment). The axial rollers 38, 42, 46, 50 are in a level position with the Y-cradles 40, 44, 48, 52 fully retracted, leaving the tubulars 152, 154 resting directly on the axial rollers 38, 42, 46, 50. In this position, the pipe 152, 154 will be allowed to be butted together before the torque (making up process) is applied. Note that the pin end 152a is aligned but detached from the box end 154a.

Figures 9, 10:
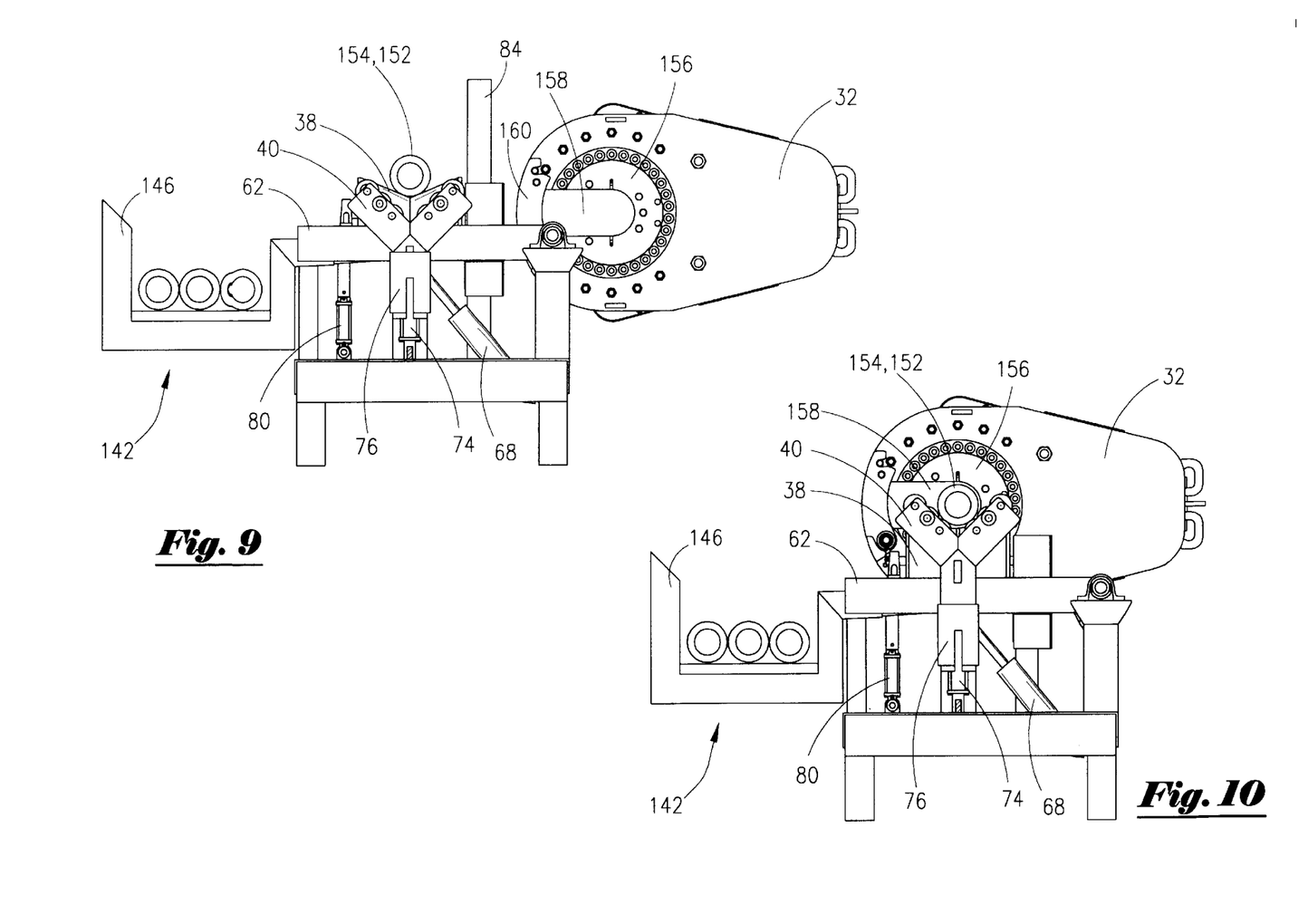
FIG. 9 is a partial front perspective view of the tubular handling system showing the tong member in a retracted position.
FIG. 10 is the illustration of FIG. 9 showing the tong member engaging the tubular members.

In the front perspective view of the tubular handling system of FIG. 9, the tong member 32 is shown in the retracted position. FIG. 9 further depicts the jaws 156, the opening 158 and the gate 160. As depicted, the tong 32 is shown retracted until the pipe 152, 154 is lifted from the axial rollers 38 by the Y-cradles 40. The axial rollers 38 are shown at level position, and the Y-cradles 40 are shown retracted for the pipe 152, 154 to lie on the axial rollers 38. This position will allow the pipe 152, 154 to be butted together before the torquing process.

The process continues as shown in FIG. 10. The tong member 32 is shown fully engaged to torque the pipe 152, 154. The axial rollers 38 are in a level position, and the Y-cradles 40 are fully extended to lift the pipe 152, 154 off the axial rollers 38 for the torquing procedure. It should be noted that in the preferred embodiment, the tong 32 will be capable of lowering approximately a minimum of 39 inches from the ground level and lifting approximately a maximum of 79 inches from ground level which allows for handling a wide range of tubular diameter since the center changes with tubulars of different diameters.

Figure 11:
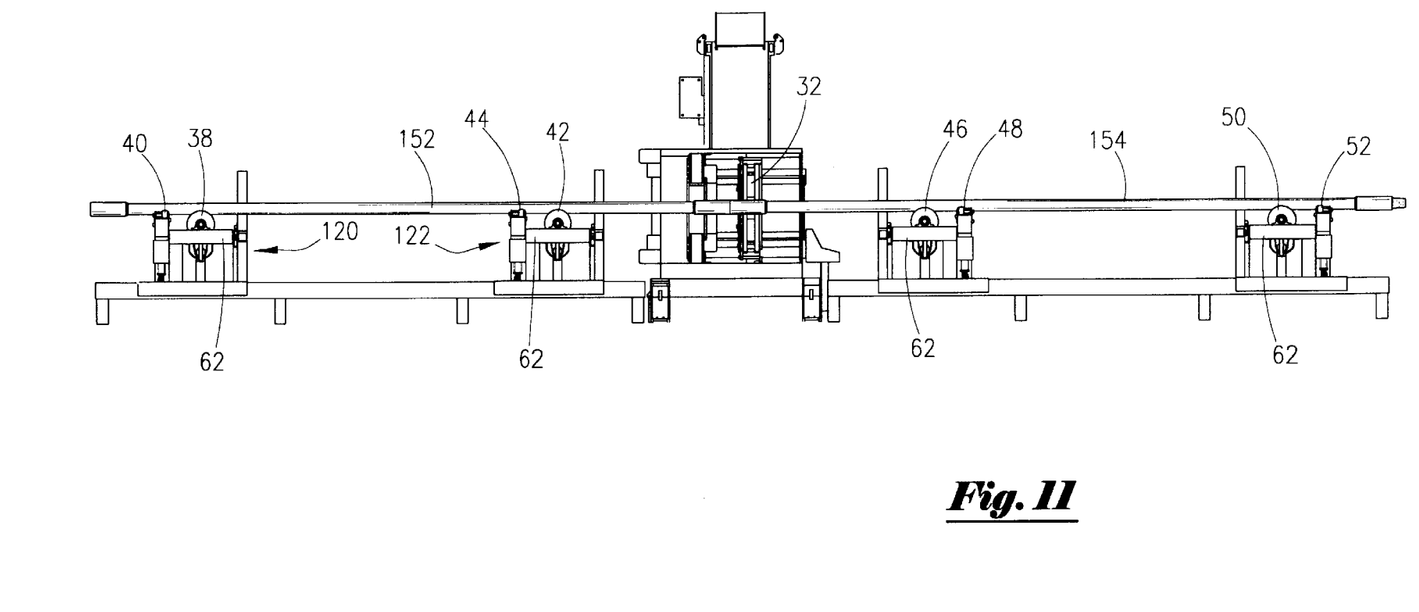
FIG. 11 is side perspective view of the tubular handling system with the tong member engaging the tubular members.

FIG. 11, which is a side perspective view of the tubular handling system, shows the tong member 32 engaging the tubular members 152, 154. The tong member 32 is in the position to accept the pin and box of the tubulars in a horizontal orientation. The axial rollers 38 are in a level position, and the Y-cradles 40 are in a fully extended position. With the Y-cradles 40 fully extended, the pipe 152, 154 is able to rotate in a 360 degree direction via the yolk rollers 70a, 70b, 70c, 70d, 70e, 70f.

Figure 12:
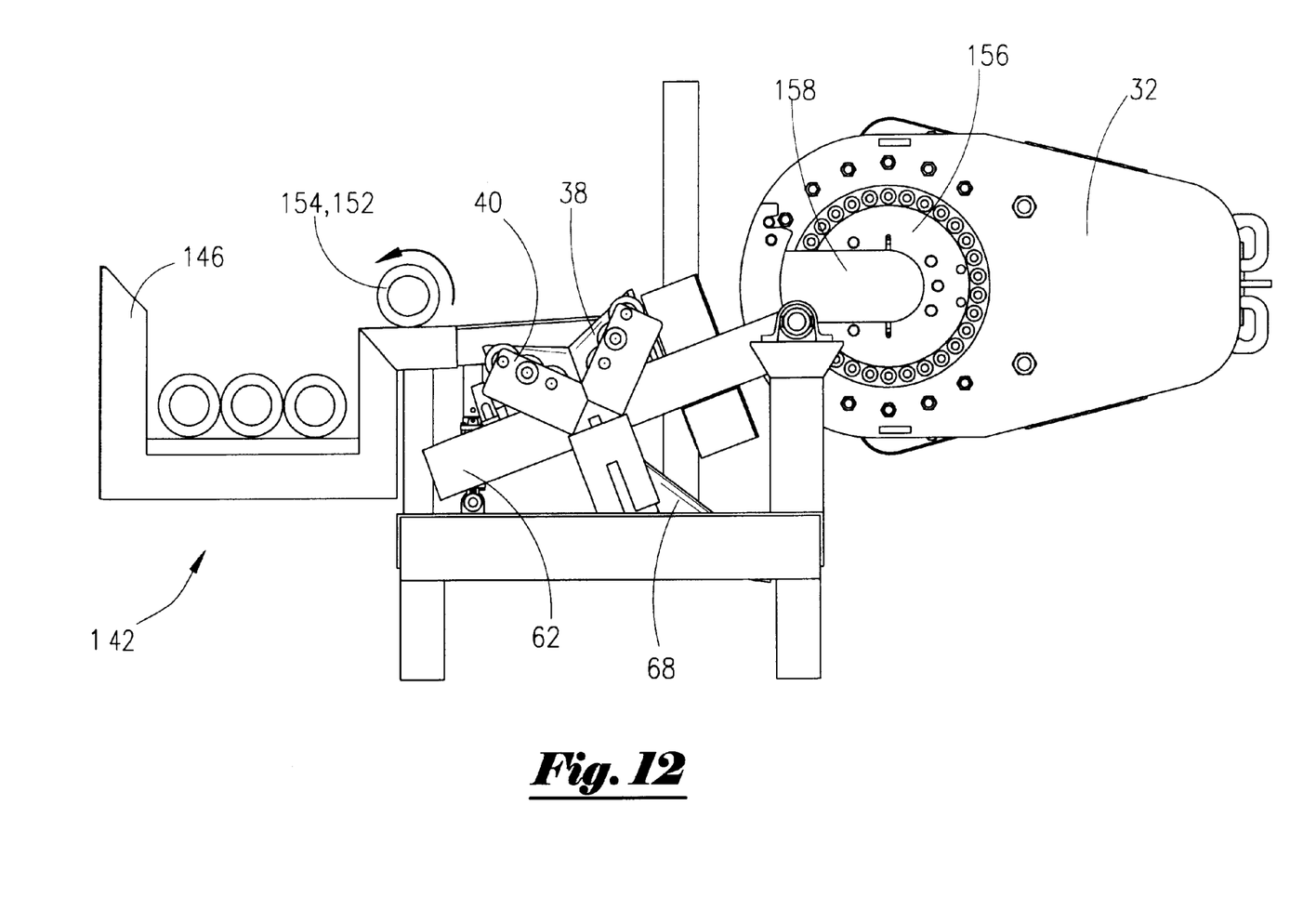
FIG. 12 is a partial front perspective view of the tubular handling system showing the removal of the tubular members.

FIG. 12 is a front perspective view of the tubular handling system showing the exiting of the tubular members. Thus, the tong 32 is shown retracted (which in the most preferred embodiment will be a distance of 3 to 4 feet). In FIG. 12, the axial rollers 38 and Y-cradles are shown fully retracted after torque process to allow the joined pipe 152/154 to lie on the pipe rail 162 and roll into the pipe catcher 142, or alternatively, simply roll onto a pipe rack.

Figure 13:
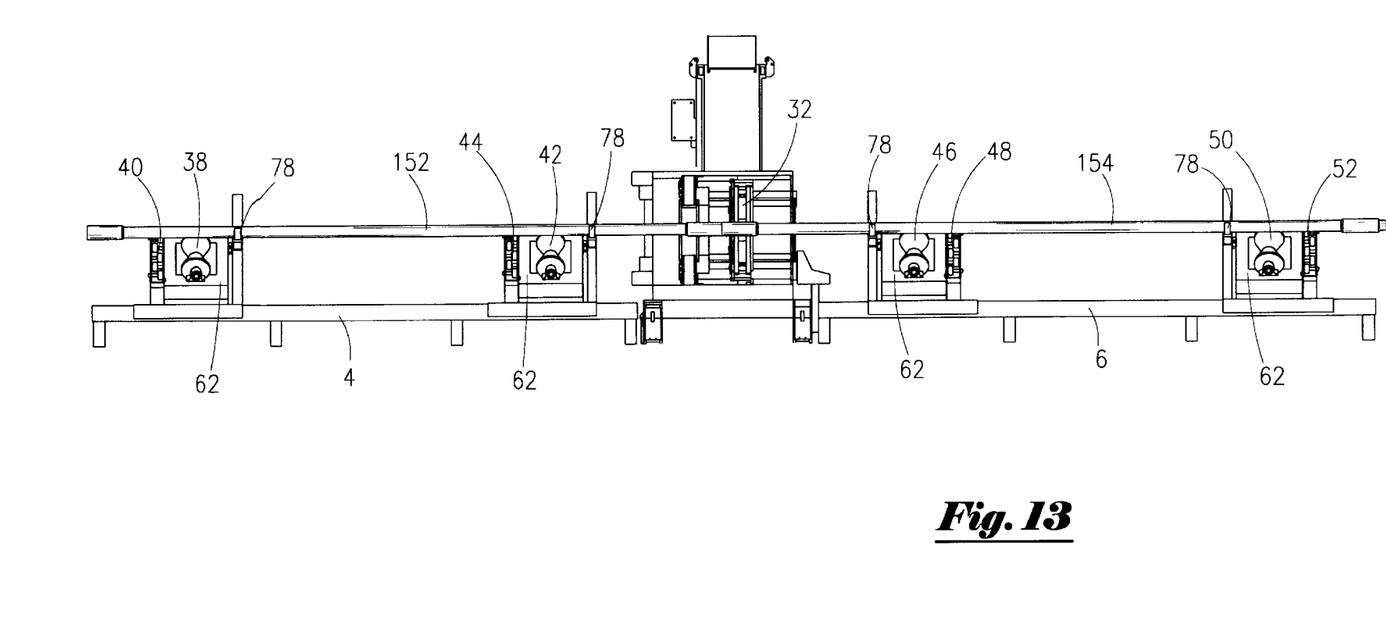
FIG. 13 is a side perspective view of the tubular handling system depicting the removal of the tubular members as seen in FIG. 12.

FIG. 13 is a side perspective view of the tubular handling system depicting the removal of the tubular members as seen in FIG. 12. The system is shown in the pipe release stage with the tong means 32 being retracted and the axial rollers 38 and the Y-cradles 40 in their most down position. The pipe 152/154 is sitting on the pipe rail 162 with the safety stops 60 engaged to hold the pipe on the pipe rail 162 until the pipe 152/154 is ready to be released into the pipe catcher 142.

Figure 14:
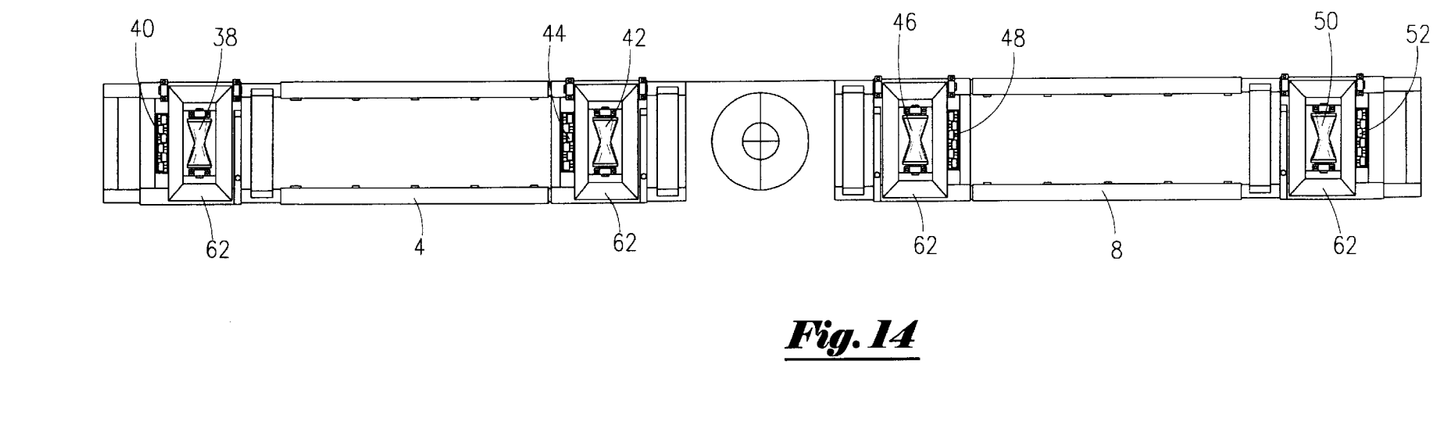
FIG. 14 is a partial top view of the tubular handling system.

In FIG. 14, a partial top view of the tubular handling system is illustrated. This partial view in FIG. 14 also depicts the mouse hole 36, with mouse hole 36 allowing the make-up and breakdown of vertically situated tubulars and bottom hole assemblies.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. An apparatus for handling a plurality of tubular members comprising:

a tong means for coupling a first tubular member with a second tubular member in a horizontal orientation, said tong means having a first side and a second side, said tong means including:

a first gripper member for gripping a pin end of the first tubular member; a second gripper member for gripping a box end of the second tubular member; a power drive section turning said second gripper member so that the pin end is threadedly engaged with the box end;

a first axial roller positioned on the first side of said tong means, said first axial roller having the first tubular member horizontally disposed thereon, said first axial roller being mounted on a first frame;

a second axial roller positioned on the second side of said tong means, said second axial roller having the second tubular member horizontally disposed thereon, said second axial roller being mounted on a second frame;

a first Y-cradle roller mounted on said first frame and positioned on the first side of said tong means;

first means for rotating said first axial roller in order to advance the first tubular member;

a second Y-cradle roller mounted on said second frame and positioned on the second side of said tong means;

second means for rotating said second axial roller in order to advance the first tubular member;

a first kicker member operatively connected to said first axial roller for lowering said first axial roller and said Y-cradle in order to eject the first tubular member;

power means for providing power to said first axial roller, said second axial roller, and said tong means.

2. The apparatus of claim 1 wherein said first kicker member comprises:

a first hydraulic cylinder being attached at one end to said first frame and attached at the other end to the first axial roller;

and wherein said power means is used for powering said first hydraulic cylinder so as to lower said first axial roller.

3. The apparatus of claim 2 wherein said first rotating means comprises:

a motor having a shaft, and wherein said shaft is attached to said first axial roller, said motor being operatively connected to said power means for imparting a rotating movement to said shaft.

4. The apparatus of claim 3 wherein said power means for providing power to said first axial roller, said second axial roller, said first and second rotating means, and said tong means comprises:

a hydraulic motor for generating a hydraulic pressure;

a hydraulic control-circuit panel, operatively connected to said hydraulic motor, said hydraulic control panel selectively providing a hydraulic operating fluid to said first axial roller, said second axial roller, said first and second rotating means, and said tong means.

5. The apparatus of claim 3 further comprising a second kicker operatively associated with said second axial roller, said second kicker comprising:

a first hydraulic cylinder being attached at one end to the second frame and attached at the other end to said second axial roller;

second hydraulic power means for powering said first hydraulic cylinder so as to lower said second roller.

6. The apparatus of claim 5 further comprising:

a second hydraulic cylinder being attached at one end to the second frame and attached at the other end to said second Y-cradle;

and wherein said second hydraulic power means is operatively connected to said second hydraulic cylinder so as to lower said second Y-cradle.

7. A tubular handling apparatus for handling a plurality of tubular members, the tubular members having a thread means on a first end and on a second end, the apparatus comprising:

a tong member having a first gripper member for gripping the first end of the first tubular member; a second gripper member for gripping the second end of the second tubular member; a power drive section turning said second gripper member so that the first end is threadedly engaged with the second end; said tong member having a first side and a second side;

a first roller member positioned on the first end of said tong member, and wherein said first roller member is configured to receive the plurality of tubular members in a horizontal orientation;

a second roller member positioned on the second end of said tong member, and wherein said second roller member is configured to receive the plurality of tubular members in a horizontal orientation;

a third roller member positioned on the first end of said tong member, and wherein said third roller member is configured to receive the plurality of tubular members in a horizontal orientation;

a fourth roller member positioned on the second end of said tong member, and wherein said fourth roller member is configured to receive the plurality of tubular members in a orientation;

wherein said first, second, third, and fourth roller member comprises: a support member; an hourglass spool attached to said support member and aligned for movement of the plurality of tubular members in a longitudinal direction; a Y-cradle set of yolk rollers attached to said support member and aligned for movement of the plurality of tubular members in a radial direction;

a first lowering means for lowering said first roller member, said second roller member, said third roller member, and said fourth roller member in order to eject said plurality of tubular members;

a hydraulic power pack for providing a hydraulic power;

a hydraulic control panel to control the hydraulic power to said first roller member, said second roller member, said third roller member, and said fourth roller member.

8. The apparatus of claim 7 further comprising:

a first hydraulic cylinder being attached at one end to the support member and attached at the other end to the first roller;

hydraulic power means for powering said first hydraulic cylinder so as to lower said hourglass spool and said Y-cradle set of yolk rollers.

9. The apparatus of claim 8 further comprising:

a motor having a shaft, and wherein said shaft is attached to said hourglass spool, said motor being operatively connected to said power pack for imparting a rotating movement to said shaft.

10. The apparatus of claim 9 wherein said tong member pivots from the horizontal inclination to a vertical inclination in order to accept the plurality of tubular members in the vertical inclination.

11. The apparatus of claim 10 further comprising:

a master bushing with a rat hole, adapted to receive the plurality of tubular members in the vertical inclination.

\* \* \* \* \*